(12) United States Patent
Maden

(10) Patent No.: US 7,035,597 B2
(45) Date of Patent: Apr. 25, 2006

(54) UNIVERSAL COMMUNICATION DEVICE

(75) Inventor: Bernard Maden, Peronnas (FR)

(73) Assignee: Gallet SA, Chatillon sur Chalaronne (FR)

(*) Notice: Subject to any disclaimer, the term of this patent is extended or adjusted under 35 U.S.C. 154(b) by 328 days.

(21) Appl. No.: 10/012,481

(22) Filed: Dec. 12, 2001

(65) Prior Publication Data
US 2002/0146987 A1 Oct. 10, 2002

(30) Foreign Application Priority Data
Dec. 12, 2000 (FR) .................... 00 16617
Jul. 3, 2001 (FR) .................... 01 08791

(51) Int. Cl.
*H04B 1/38* (2006.01)
(52) U.S. Cl. ................ 455/90.2; 455/569.1; 455/575.1
(58) Field of Classification Search ............. 455/90.2, 455/569.1, 569.2, 575.2, 344–351; 379/420.04, 379/423, 428.02
See application file for complete search history.

(56) References Cited

U.S. PATENT DOCUMENTS

| 5,140,994 A * | 8/1992 | Campbell et al. ........... 600/595 |
| 5,664,012 A | 9/1997 | Chen |
| 5,790,947 A | 8/1998 | Dieringer |

FOREIGN PATENT DOCUMENTS

FR 2730388 8/1996

* cited by examiner

*Primary Examiner*—Lee Nguyen
(74) *Attorney, Agent, or Firm*—Greenblum & Bernstein, P.L.C.

(57) ABSTRACT

Communication device including at least one headset constituted by a microphone or osteomicrophone such as an accelerometer, and at least one earphone, characterized in that it includes a mechanism enabling compatibility with various types of transceivers.

7 Claims, 3 Drawing Sheets

UNIVERSAL COMMUNICATION DEVICE

The invention relates to a universal communication device enabling the user to be connected to any type of communication equipment.

BACKGROUND OF THE INVENTION

1. Field of the Invention

The present invention relates to a universal communication device enabling the user to connect to any type of communication equipment.

The invention is adapted more particularly for use by the military, but can be used, of course, by the police, gendarmerie, or even by civilians.

2. Discussion of Background Information

To communicate, the military currently uses a communication system including a headset with a microphone or an osteomicrophone and one or two earphones, this headset being adapted to be connected directly to the communication equipment, such as a According to another characteristic, the mechanism enabling compatibility with various types of transceivers are constituted by an automatic grounding system, enabling the grounding of the device to be common or separate.

To communicate, the military currently uses a communication system including a headset with a microphone or an osteomicrophone and one or two earphones, said headset being adapted to be connected directly to the communication device itself, such as a transceiver. But the current devices allow using only communication devices that are compatible with the headset, and therefore users cannot be connected to different transmitters or onboard equipment that would not be compatible.

The present invention makes it possible to overcome the aforementioned disadvantages of the conventional communication systems.

Thus, the communication device according to the invention, including at least one headset constituted by a microphone or osteomicrophone such as an accelerometer, is characterized in that it includes means enabling compatibility with various types of transceivers.

According to one complementary characteristic, the means enabling compatibility with various types of transceivers are constituted by an interface box including an electronic circuit powered by a battery, said box being arranged between the headset and the transceiver.

According to another characteristic, the means enabling compatibility with various types of transceivers are constituted by an automatic grounding system, enabling the grounding of the device to be common or separate.

In addition, the device includes a mechanism such that, in the case of a connection with onboard equipment, the onboard power supply replaces the battery supply of the box.

Furthermore, the communication device includes a set of connecting cable enabling the electronic box to be connected to the various transmitter or equipments which the users may encounter, such as onboard transmitters, onboard radios, portable transmitter for the infantry, intercom for the navy and the air force, etc., whereas each of the plugs of each of the connecting cables enables compatibility with the various tybes of transceivers, makes it possible to automatically configure the electronic box without requiring special keypads or selector knobs.

It is noted that the box includes an electronic circuit having a power supply, a jack enabling the connection of the headset, and at least one radio jack enabling the connection to two transmitters, whereas the interface box advantageously includes two radio jacks and a jack enabling the connection of a finger PTT control device, as well as two PTT switches.

The electronic circuit is constituted of various components connected to one another, namely, a power supply battery, a power supply switch, and a power supply control, arranged between a terminal of the jack for connecting the headset and an amplifier connected to an isolating transformer, on the one hand, and to the terminal of the jack, on the other hand.

The communication device according to the invention, includes at least one headset, the device comprising at least one of a microphone or osteomicrophone, at least one earphone, and a mechanism enabling compatibility with various types of transceivers. The at least one of a microphone or osteomicrophone may comprise an accelerometer.

According to the invention, the mechanism enabling compatibility with various types of transceivers may comprise an interface box including an electronic circuit powered by a battery, the box being arranged between the at least one headset and the various types of transceivers. The mechanism enabling compatibility with various types of transceivers may further comprise an automatic grounding system. The mechanism enabling compatibility with various types of transceivers is connectable to onboard equipment which includes an onboard power supply, wherein the onboard power supply serves as the battery for the electronic circuit of the interface box.

According to another aspect of the invention, the communication device may further comprise a set of connecting cables enabling the electronic circuit to be connected to the various types of transceivers. The set of connecting cables may include plugs, and each of the plugs of each of the set of connecting cables may enable compatibility with the various types of transceivers, thereby making it possible to automatically configure the electronic circuit without requiring a special keypad or selector knobs.

According to yet another aspect of the invention, the box may comprise an electronic circuit having a power supply, a jack enabling the connection of the at least one headset, and at least one radio jack enabling the connection to two transmitters. The box may further comprise two radio jacks and a jack enabling connection of a finger PTT control device, as well as two PTT switches.

Moreover, the electronic circuit may include various components connected to one another, the components comprising a power supply battery, a power supply switch, and a power supply control arranged between a terminal of a jack for connecting the at least one headset and an amplifier connected to an isolating transformer, on one hand, and to the terminal of the jack, on the other hand.

According to the invention, a communication device includes at least one headset, the device comprising at least one of a microphone or osteomicrophone, at least one earphone, and an interface box including an electronic circuit powered by a battery and an automatic grounding system, the box being arranged between the at least one headset and various types of transceivers for enabling compatibility with the various types of transceivers, and a set of connecting cables enabling the electronic circuit to be connected to the various types of transceivers.

According to another aspect of the invention, the set of connecting cables may include plugs, and each of the plugs of each of the set of connecting cables may enable compatibility with the various types of transceivers, thereby making it possible to automatically configure the electronic circuit without requiring a special keypad or selector knobs. Moreover, the electronic circuit may include various components connected to one another, the components comprising a power supply battery, a power supply switch, and a power supply control arranged between a terminal of a jack for connecting the at least one headset and an amplifier connected to an isolating transformer, on one hand, and to the terminal of the jack, on the other hand.

Other characteristics and advantages of the invention will become apparent from the description that follows, with reference to the annexed drawings which are only provided by way of non-limiting examples.

BRIEF DESCRIPTION OF DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

Figure 1:
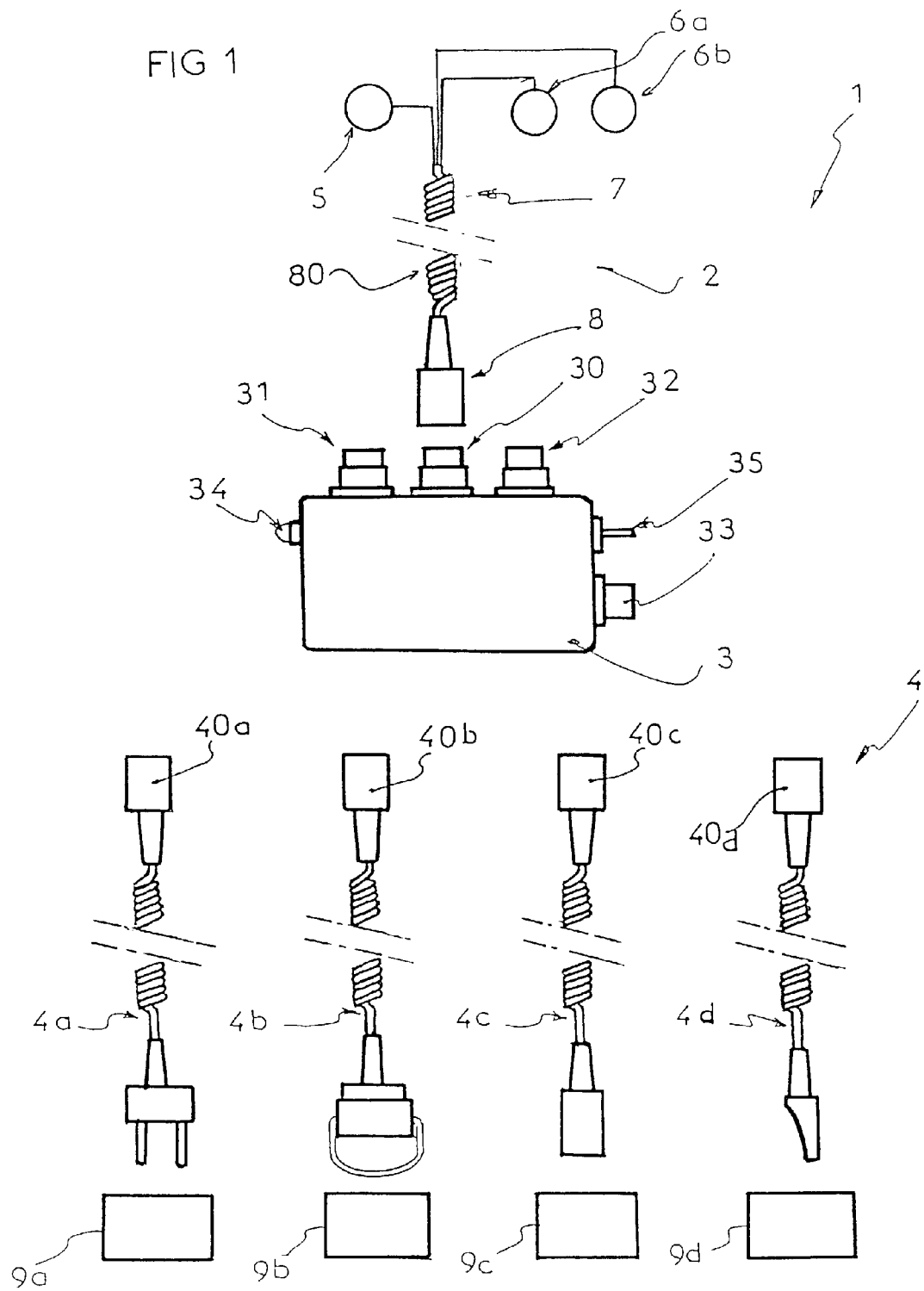
FIG. 1 is a general diagram of the universal communication device of the invention.
Figure 2:
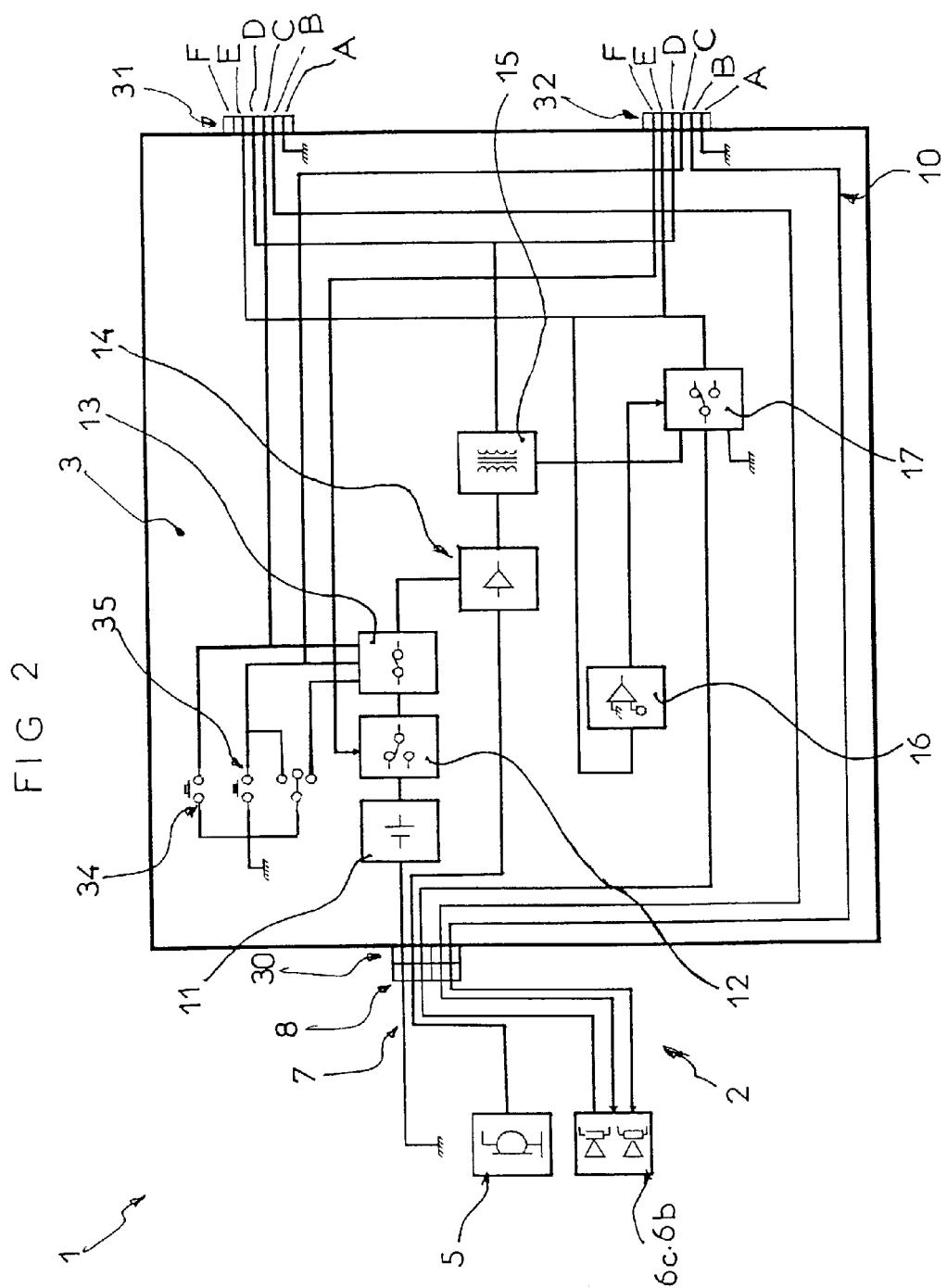
FIG. 2 is a block diagram showing the electronic circuit.
Figure 3:
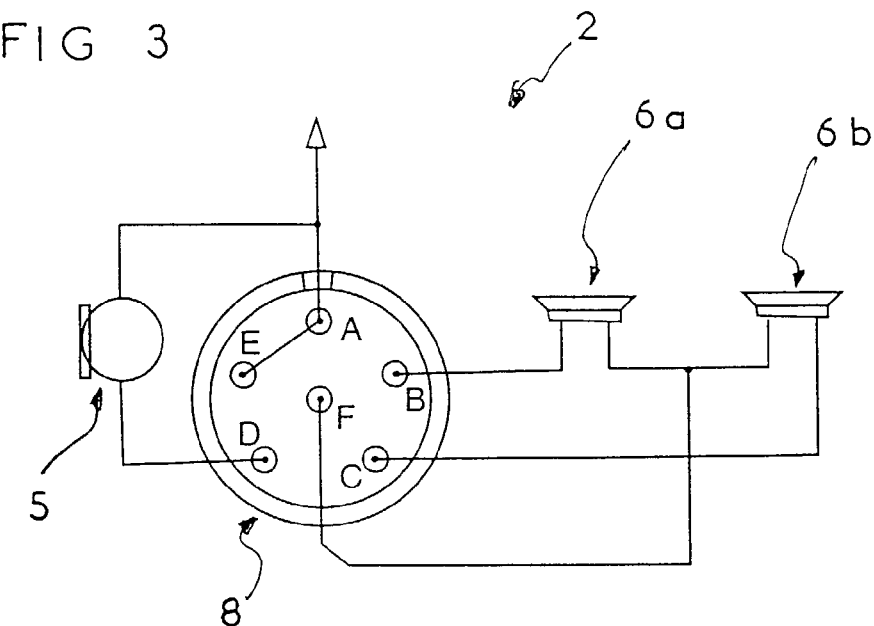
FIG. 3 is a view showing the headset with its plug connector.
Figure 4A:
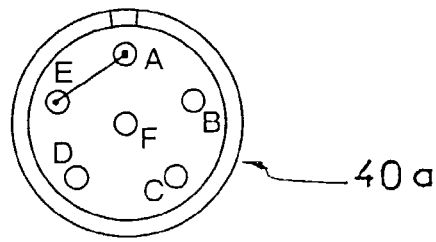
FIGS. 4a, 4b, 4c, 4d are schematic views showing the plug connectors with their contacts for the various communication devices.
Figure 4B:
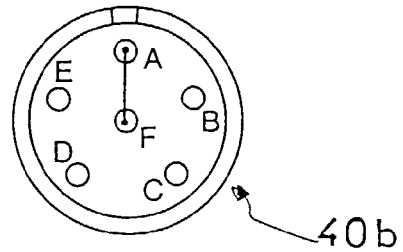
Figure 4C:
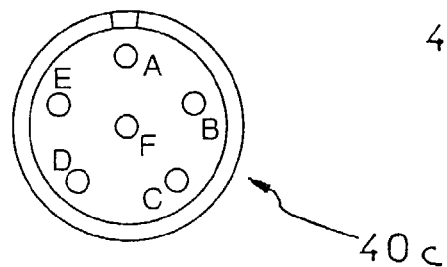
Figure 4D:
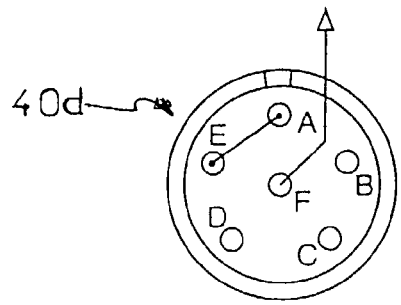

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The communication system of the invention generally designated by the reference numeral (1) includes a headset (2), an electronic box (3) and a set of connecting cables (4) enabling the electronic box to be connected to the various transmitters or onboard equipment.

The headset (2) includes, in a known fashion, a microphone or osteomicrophone (5) and one or two earphones (6a, 6b). The headset (1) can be of any known type, for example, held by a headband, incorporated into a protective headgear, or in an active or passive anti-noise, whereas it includes a headset connection cable (80) whose end has a plug connector (8) enabling the coupling of the headset to the electronic box (3). Of course, the connecting cable (80) can be advantageously equipped with a safety plug, known in itself, commonly called self-breaking plug, self-breaking switch, or cut-off switch, which enables automatic disconnection in the case of excessive traction on the cable (80), without deterioration of the equipment and possibility of immediately reconnecting the device.

The electronic box (3) is an interface between the headset (2) and the communication devices (9a, 9b, 9c) to which the user can be connected. It is known that the communication devices are very different from one another, and the electronic box (3) of the invention enables the user to connect to these various devices, whereas the electronic circuit (10) of the box (3) recognizes the communication devices and enables the user to use them without performing any manipulation or adjustment.

Therefore, the electronic box (3) makes it possible, for example, to connect two transmitters, and to control them separately or simultaneously with two PTT (push to talk) buttons. One of the PTT buttons has an intercom position for an aircraft, helicopter, land vehicle or boat onboard interphone.

Thus, the electronic box (3) includes an electronic circuit (10) powered by a battery (11), a jack (30) enabling the connection of the headset (2), two radio jacks (31, 32) enabling the connection to two transmitters, a jack (33) enabling the connection of a finger PTT control device, two PTT switches (34, 35) whose operation is explained hereinafter.

According to a characteristic of the invention, the box (3) does not have an ON/OFF button for the electronic circuit (10), in order to prevent an ill-timed wear of the battery powering the electronic circuit. Thus, the box includes a mechanism making it possible to avoid an accidental discharge of the battery if incorrectly stored when the headset (2) is disconnected, and only pressing one of the PTT buttons (34) or the intercommunication position allows the use of the incorporated battery.

Furthermore, a mechanism is also provided such that, in the case of a connection to an onboard equipment, the onboard power supply replaces the battery power supply of the box.

According to another characteristic of the invention, the electronic circuit of the box includes a mechanism enabling compatibility with the various communication devices, whether the equipment is for the infantry, the air force, or the navy. This mechanism comprises an automatic systems for common or distinct ground. Thus, during the connection of the various plug connectors (8, 40a, 40b, 40c, 40d) corresponding to the headset (8) and/or of the transceivers and/or of the onboard equipment (9a, 9b, 9c, 9d), the electronic circuit (10) is provided to recognize the type of connection and to thus adapt the corresponding ground.

As seen previously, the device (1) further includes a set (4) of adapted connecting cables (4a, 4b, 4c, 4d) whose terminations make it possible to connect the various transmitters or onboard equipment (9a, 9b, 9c, 9d) to the jacks (31, 32) of the box (3), and to automatically configure the electronic box, without requiring a keypad or selector knobs.

Due to its electronic box (3), the universal communication device is compatible with the various transceiver systems, the latter being those used by the infantry, navy, aircraft pilots, etc.

Thus, the following operations are possible: transceivers or intercom with microphone/earphones common ground. According to this operating mode, the plug connector (4a) is such that its terminals (A) and (B) are connected by a jumper which, during the coupling to one of the radio jacks (31, 32), causes the corresponding terminals (a) and (e) to be short circuited, and the grounding switch (17) short circuits the grounds of the microphone (5) and of the earphones (6a, 6b) which are then common. In the case of a coupling of the plug connector (40a) to one of the radio jacks (31, 32), the power supply of the circuit is ensured by the battery (11);

transceivers or intercom with microphone/earphones distinct grounds, the PTT buttons having the same ground as the microphone. According to this operating mode, the plug connector (40c) is such that the terminals (A) and (E) are not connected by a jumper, and are therefore free. During the coupling to one of the radio jacks (31, 32), the grounding switch (17) separates the ground of the microphone (5) from the ground of the earphones (6a, 6b), the base ground then being the ground of the earphones (6a, 6b);

transceivers or intercom with microphone/earphones distinct grounds, the PTT buttons having the same ground as the earphones and the transmission or intercom control being ensured by a single conductor on the onboard equipment. According to this operating mode, the plug connector (40b) is such that the terminals (A) and (F) are short circuited by a jumper. During the coupling to the radio jack (32), the grounding switch (17) affixes the ground of the earphone (6a, 6b) to the base ground and renders the ground of the microphone (5) independent;

intercom powered by the onboard power supply. According to this operating mode, the plug (4d) is such that its terminals (A) and (B) are short circuited by a jumper, whereas the onboard power supply is connected to the central terminal (F). During the connection of the plug (4d), the grounding switch (17) enables the grounds of the microphone (5) and of the earphones (6a, 61) to be common, the power supply by the battery (11) is stopped in favor of the onboard power supply.

intercom powered by the onboard power supply. According to this operating mode, the plug (4d) is such that its terminals (A) and (E) are short circuited by a jumper, whereas the onboard power supply is connected to the central terminal (F). During the connection of the plug (4d), the grounding switch (17) enables the groundings of the microphone (5) and of the earphones (6a, 6b) to be common, the power supply by the battery (11) is stopped in favor of the onboard power supply.

The power supply of the electronic circuit by the battery is used only if the headset (2) is connected by its plug connector (8) to the corresponding jack (30) of the electronic box (3). So that the battery (11) is used only when the headset (2) is connected, the plug connector (8) includes a jumper between the terminals (A) and (E), which allows the grounding of the battery (11).

But the power supply can be provided by the onboard electricity if the plug of the onboard equipment is connected to the jack (32) which, by its central terminal (F), receives 28 volts.

It is noted that, due to the electronic circuit, pressing one of the PTT (34, 35) or intercommunication (36) buttons makes it possible to power the circuit, the release of the button then cutting the power supply.

The electronic circuit (10) is constituted of various components connected to one another, namely, a power supply battery (11), a power supply switch (12), and a power supply control (13), arranged between a terminal of the jack (30) for the connection of the headset (2) and an amplifier (14) connected to an isolating transformer (15), on the one hand, and to a terminal of the jack (30), on the other hand.

The electronic circuit (10) further includes a ground comparator (16) connected to a grounding switch (17).

Of course, the aforementioned components are directly or indirectly connected to the various sockets, namely, the jack (30) for connecting the headset (2) and the two radio jacks (31, 32), as well as to the PTT switches (34, 35).

It is understood that the invention is not limited to the embodiment described and shown by way of examples, but also includes all of the technical equivalents as well as their combinations.

The invention claimed is:

1. Communication device including at least one headset, said device comprising:
    at least one of a microphone or osteomicrophone;
    at least one earphone;
    a mechanism enabling compatibility with various types of transceivers comprising an interface box including an electronic circuit powered by a battery, said box being arranged between the at least one headset and the various types of transceivers,
    wherein the mechanism enabling compatibility with various types of transceivers further comprises an automatic grounding system.

2. The communication device according to claim 1, wherein the mechanism enabling compatibility with various types of transceivers is connectable to onboard equipment which includes an onboard power supply, wherein said onboard power supply serves as the battery for the electronic circuit of the interface box.

3. Communication device including at least one headset, said device comprising:
    at least one of a microphone or osteomicrophone;
    at least one earphone;
    a mechanism enabling compatibility with various types of transceivers comprising an interface box including an electronic circuit powered by a battery, said box being arranged between the at least one headset and the various types of transceivers,
    wherein the set of connecting cables enabling compatibility with the various types of transceivers enables the electronic circuit to be connected to the various types of transceivers, and
    wherein said set of connecting cables includes plugs, and wherein each of the plugs of each of the set of connecting cables enables compatibility with the various types of transceivers, thereby making it possible to automatically configure the electronic circuit without requiring a special keypad or selector knobs.

4. Communication device including at least one headset, said device comprising:
    at least one of a microphone or osteomicrophone;
    at least one earphone;
    a mechanism enabling compatibility with various types of transceivers comprising an interface box including an electronic circuit powered by a battery, said box being arranged between the at least one headset and the various types of transceivers,
    wherein the electronic circuit includes various components connected to one another, said components comprising:
    the battery being a power supply battery;
    a power supply switch; and
    a power supply control arranged between a terminal of a jack for connecting the at least one headset and an amplifier connected to an isolating transformer, on one hand, and to the terminal of the jack, on the other hand.

5. Communication device including at least one headset, said device comprising:
    at least one of a microphone or osteomicrophone;
    at least one earphone;
    an interface box including an electronic circuit powered by a battery and an automatic grounding system, said box being arranged between the at least one headset and various types of transceivers for enabling compatibility with the various types of transceivers; and a set of connecting cables enabling the electronic circuit to be connected to the various types of transceivers.

6. The communication device according to claim 5, wherein said set of connecting cables includes plugs, and wherein each of the plugs of each of the set of connecting cables enables compatibility with the various types of transceivers, thereby making it possible to automatically configure the electronic circuit without requiring a special keypad or selector knobs.

7. The communication device according to claim 5, wherein the electronic circuit includes various components connected to one another, said components comprising:

a power supply battery;

a power supply switch; and a power supply control arranged between a terminal of a jack for connecting the at least one headset and an amplifier connected to an isolating transformer, on one hand, and to the terminal of the jack, on the other hand.

* * * * *